United States Patent
Shetty et al.

(10) Patent No.: US 10,917,819 B2
(45) Date of Patent: Feb. 9, 2021

(54) DRIVELESS METHOD TO CAPTURE CSFB EXPERIENCE

(71) Applicant: Telefonaktiebolaget LM Ericsson (publ), Stockholm (SE)

(72) Inventors: Manoj Shetty, Mumbai (IN); Surajit Mondal, Gurgaon (IN); Vijayant Thakur, Mandi (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 342 days.

(21) Appl. No.: 15/775,280

(22) PCT Filed: Nov. 12, 2015

(86) PCT No.: PCT/IN2015/050163
§ 371 (c)(1),
(2) Date: May 10, 2018

(87) PCT Pub. No.: WO2017/081696
PCT Pub. Date: May 18, 2017

(65) Prior Publication Data
US 2018/0376382 A1    Dec. 27, 2018

(51) Int. Cl.
*H04W 36/00* (2009.01)
*H04W 80/06* (2009.01)
(Continued)

(52) U.S. Cl.
CPC ... *H04W 36/0022* (2013.01); *H04W 36/0058* (2018.08); *H04W 36/0083* (2013.01);
(Continued)

(58) Field of Classification Search
CPC ..... H04W 16/18; H04W 80/10; H04W 76/16; H04W 36/0022; H04W 36/0083; H04W 36/0058
(Continued)

(56) References Cited

U.S. PATENT DOCUMENTS

RE41,210 E * 4/2010 Wang ................. H04N 21/6377
709/229
2009/0318147 A1 * 12/2009 Zhang .................. H04L 61/106
455/435.1
(Continued)

OTHER PUBLICATIONS

International Search Report and Written Opinion dated Jul. 27, 2016 issued in International Application No. PCT/IN2015/050163 (8 pages).
(Continued)

*Primary Examiner* — Jae Y Lee
*Assistant Examiner* — Jean F Voltaire
(74) *Attorney, Agent, or Firm* — Rothwell, Figg, Ernst & Manbeck, P.C.

(57) ABSTRACT

The present disclosure relates to a method of obtaining at least one Key Performance Indicator (KPI) for a communication session (11) of a radio device (2). The communication session is moved from a first Radio Access Technology (RAT) (3a) to a second RAT (3b). The method comprises extracting first information about the communication session from at least a first log associated with the first RAT by filtering information relating to communication sessions which have moved between RATs from other communication sessions in the first log. The first information comprises a session identifier (ID) and a first time stamp associated with the communication session. The method also comprises extracting second information about the communication session from a second log associated with the second RAT by filtering information relating to communication sessions which have moved between RATs from other communication sessions in the second log. The first information comprises the session ID and a second time stamp associated with the communication session. The method also comprises merging the extracted first and second information with each other by means of the session ID and the first and second
(Continued)

time stamps. The method also comprise determining the at least one KPI for the communication session based on the merged information.

21 Claims, 3 Drawing Sheets

(51) Int. Cl.
 *H04W 80/10* (2009.01)
 *H04W 76/16* (2018.01)
(52) U.S. Cl.
 CPC .......... *H04W 76/16* (2018.02); *H04W 80/06* (2013.01); *H04W 80/10* (2013.01)
(58) Field of Classification Search
 USPC ........................................................ 370/331
 See application file for complete search history.

(56) References Cited

U.S. PATENT DOCUMENTS

| | | | |
|---|---|---|---|
| 2011/0222509 A1 | 9/2011 | Lee | |
| 2015/0131619 A1* | 5/2015 | Zhu | H04W 36/0022 370/332 |
| 2016/0021673 A1* | 1/2016 | Ahmadzadeh | H04L 65/80 370/331 |
| 2018/0152984 A1* | 5/2018 | Palanisamy | H04W 76/12 |

OTHER PUBLICATIONS

Bhebhe et al., "Performance of Circuit Switched Fall Back & Single Radio Voice Call Continuity From TD-LTE to UMTS", IEEE Engineering Software, Telecommunications and Computer Networks (SoftCOM), 2014 22nd International Conference. (5 pages).
3GPP, 3rd Generation Partnership Project; Technical Specification Group Services and System Aspects; Circuit Switched (CS) Fallback in Evolved Packet System (EPS); Stage 2 (Release 10), 3GPP TS 23.272, V10.5.0, Sep. 2011. (79 pages).
3GPP, 3rd Generation Partnership Project; Technical Specification Group (TSG) RAN; Working Group 2 (WG2); RRC Protocol Specification; TSG-RAN Meeting #5, Kyongju, Sweden, Oct. 6-8, 1999; TSG-RP#5(99)468; 3GPP TS 25.331, V1.5.0, Sep. 1999. (218 pages).
LTE; Evolved Universal Terrestrial Radio Access (E-UTRA); Radio Resource Control (RRC); Protocol Specification (3GPP TS 36.331 version 9.8.0 Release 9); ETSI TS 136 331 V9.8.0 (Nov. 2011). (255 pages).

* cited by examiner

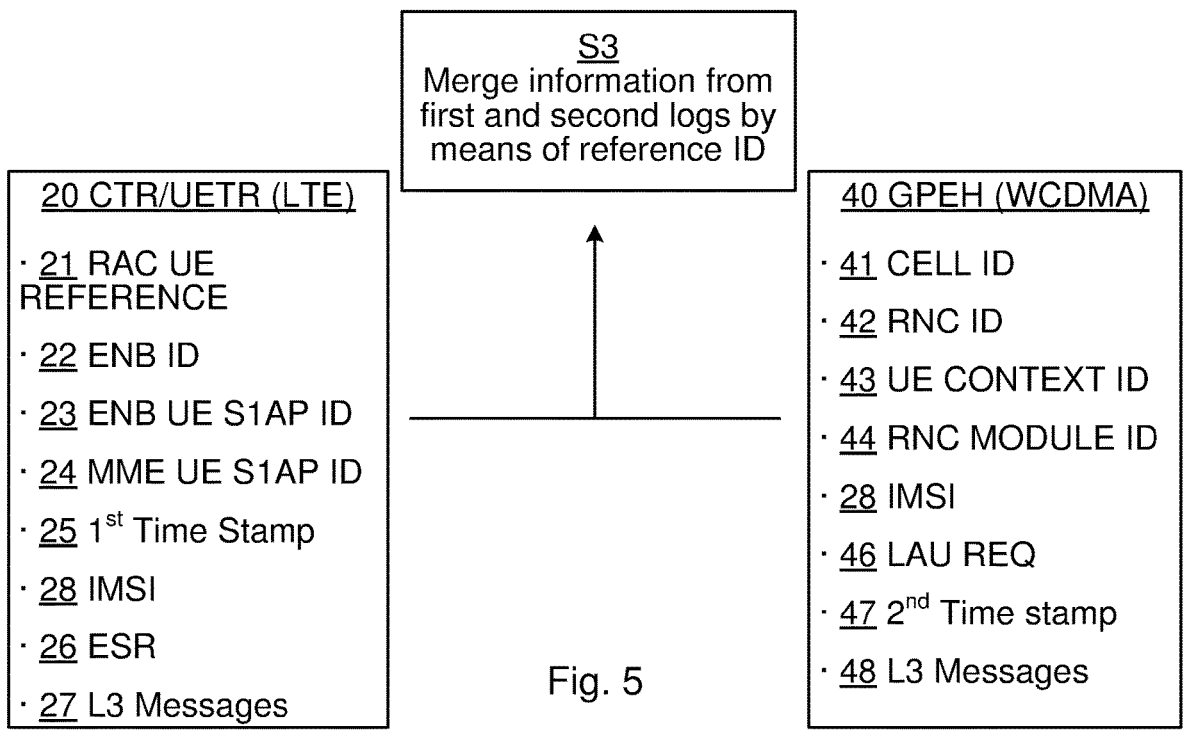
Fig. 5
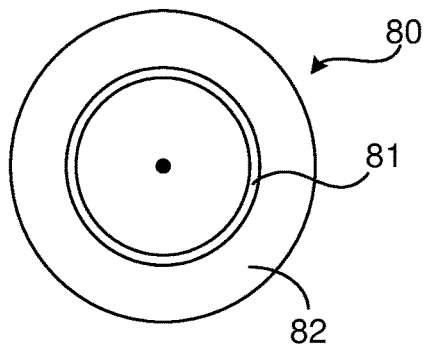
Fig. 6
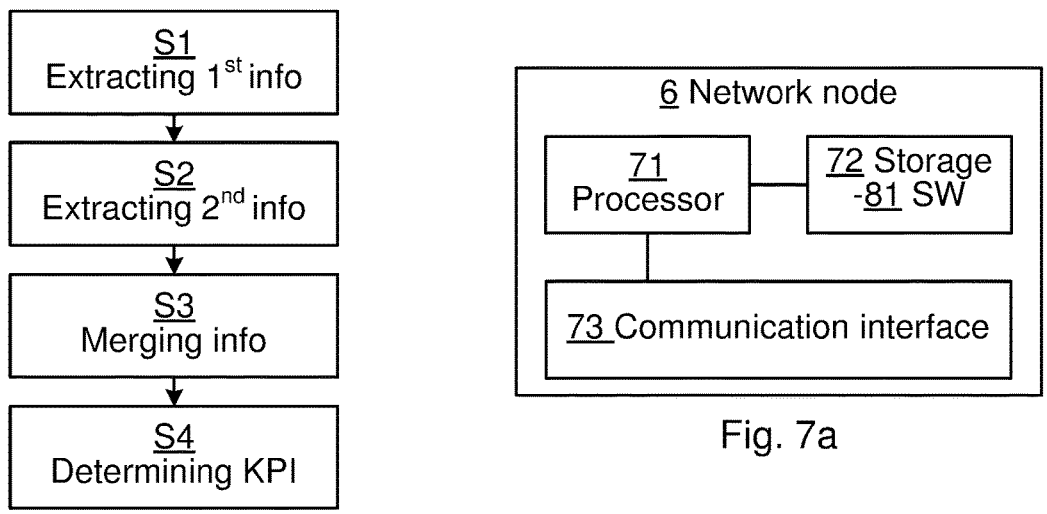
Fig. 7a
Fig. 7b
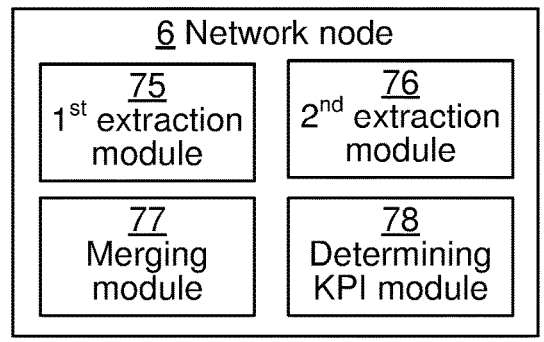
Fig. 8

DRIVELESS METHOD TO CAPTURE CSFB EXPERIENCE

CROSS REFERENCE TO RELATED APPLICATION(S)

This application is a 35 U.S.C. § 371 National Stage of International Patent Application No. PCT/IN2015/050163, filed Nov. 12, 2015, designating the United States. The above identified applications are incorporated by reference.

TECHNICAL FIELD

The present disclosure relates to a method of obtaining at least one Key Performance Indicator (KPI) for a communication session of a radio device.

BACKGROUND

Circuit-Switched Fall-back (CSFB) and Single Radio Voice Call Continuity (SRVCC) calls involve two Radio Access Technologies (RATs), Third Generation Partnership Project (3GPP) Long Term Evolution (LTE) and 3G/2G such as Wideband Code Division Multiple Access (WCDMA), Code Division Multiple Access (CDMA) or Global System for Mobile Communications (GSM), currently drive test is the only way to accurately identify CSFB/SRVCC and Inter RAT (IRAT) related KPIs like Call Success Rate and Call Setup Time. However, there are some draw-backs with drive testes, such as:

Drive test based testing may increase time and cost.

Drive test based testing typically captures only outdoor performance.

Drive test based data does not capture issues related to interfaces in the Core Network (CN) of a telecommunication operator network.

The Evolved Packet Core (EPC) of LTE is a packet-only core network. It does not have a circuit-switched domain, which is traditionally used for phone calls and Short Message Service (SMS). 3GPP has specified CSFB as a solution for voice. For CSFB, in order to make or receive calls, the User Equipment (UE) changes its radio access technology from LTE to a 2G/3G technology that supports circuit-switched services. SRVCC, on the other hand, provides a solution for handing over Voice over LTE (VoLTE) to 2G/3G networks. The voice calls on LTE network are packet switched calls. To make it inter operable with circuit switched networks, these calls are handed over to circuit switched calls in GSM/WCDMA networks.

Unlike 3G to 2G handover there are no feedback mechanisms in LTE to 3G handover during CSFB or SRVCC. Hence, there is no visibility after LTE Radio Resource Control (RRC) Release Call to 3G through counters and the only way to capture this event would be through drive test data.

Even with drive test data it may not be possible to troubleshoot issues on the core side since drive test data typically only relate to the layer 3 (L3), i.e. the network layer of the Open Systems Interconnection (OSI) model, messages over the air interface.

Since there are no feedback mechanisms available in current standards, there is a limitation on visibility after the UE has been release from the LTE side. The 3G network has some counters for CSFB assessment but they cannot be correlated with LTE.

SUMMARY

It is an objective of the present disclosure to provide means for obtaining KPIs for inter RAT communication sessions which have been moved from a first RAT to a second RAT.

In accordance with the present solution, cell trace data from both a first RAT, e.g. LTE, and a second RAT, e.g. WCDMA, to calculate KPIs e.g. CSFB/SRVCC and IRAT KPIs for a radio device or group of radio devices. The idea is to map the two data source for a single session (e.g. a voice call) and extract the required information for measuring KPIs and troubleshooting.

According to an aspect of the present disclosure, there is provided a method of obtaining at least one KPI for a communication session of a radio device. The communication session is moved from a first RAT to a second RAT. The method comprises extracting first information about the communication session from at least a first log associated with the first RAT by filtering information relating to communication sessions which have moved between RATs from other communication sessions in the first log. The first information comprises a session identifier (ID) and a first time stamp associated with the communication session. The method also comprises extracting second information about the communication session from a second log associated with the second RAT by filtering information relating to communication sessions which have moved between RATs from other communication sessions in the second log. The first information comprises the session ID and a second time stamp associated with the communication session. The method also comprises merging the extracted first and second information with each other by means of the session ID and the first and second time stamps. The method also comprise determining the at least one KPI for the communication session based on the merged information.

According to another aspect of the present disclosure, there is provided a network node configured for obtaining at least one KPI for a communication session of a radio device, which communication session is moved from a first RAT to a second RAT. The network node comprises processor circuitry, and storage storing instructions executable by said processor circuitry whereby said network node is operative to extract first information about the communication session from at least a first log associated with the first RAT by filtering information relating to communication sessions which have moved between RATs from other communication sessions in the first log, the first information comprising a session ID and a first time stamp associated with the communication session. The network node is also operative to extract second information about the communication session from a second log associated with the second RAT by filtering information relating to communication sessions which have moved between RATs from other communication sessions in the second log, the first information comprising the session ID and a second time stamp associated with the communication session. The network node is also operative to merge the extracted first and second information with each other by means of the session ID and the first and second time stamps. The network node is also operative to determine the at least one KPI for the communication session based on the merged information.

According to another aspect of the present disclosure, there is provided a computer program product comprising computer-executable components for causing a network node to perform an embodiment of the method of the present disclosure when the computer-executable components are run on processor circuitry comprised in the network node.

According to another aspect of the present disclosure, there is provided a computer program for obtaining at least one KPI for a communication session of a radio device, which communication session is moved from a first RAT to a second RAT. The computer program comprises computer program code which is able to, when run on processor circuitry of a network node, cause the network node to extract first information about the communication session from at least a first log associated with the first RAT by filtering information relating to communication sessions which have moved between RATs from other communication sessions in the first log, the first information comprising a session ID and a first time stamp associated with the communication session. The code is also able to cause the network node to extract second information about the communication session from a second log associated with the second RAT by filtering information relating to communication sessions which have moved between RATs from other communication sessions in the second log, the first information comprising the session ID and a second time stamp associated with the communication session. The code is also able to cause the network node to merge the extracted first and second information with each other by means of the session ID and the first and second time stamps. The code is also able to cause the network node to determine the at least one KPI for the communication session based on the merged information.

According to another aspect of the present disclosure, there is provided a computer program product comprising an embodiment of the computer program of the present disclosure and a computer readable means on which the computer program is stored.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 5 is a schematic block diagram illustrating an embodiment of merging information from the first log regarding a communication session with information from the second log regarding the same session.

FIG. 6 is a schematic flow chart of an embodiment of the method of the present disclosure.

FIG. 7a is a schematic block diagram of an embodiment of a network node of the present disclosure.

FIG. 7b is a schematic functional block diagram of an embodiment of a network node of the present disclosure.

FIG. 8 is an illustration of an embodiment of a computer program product of the present disclosure.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
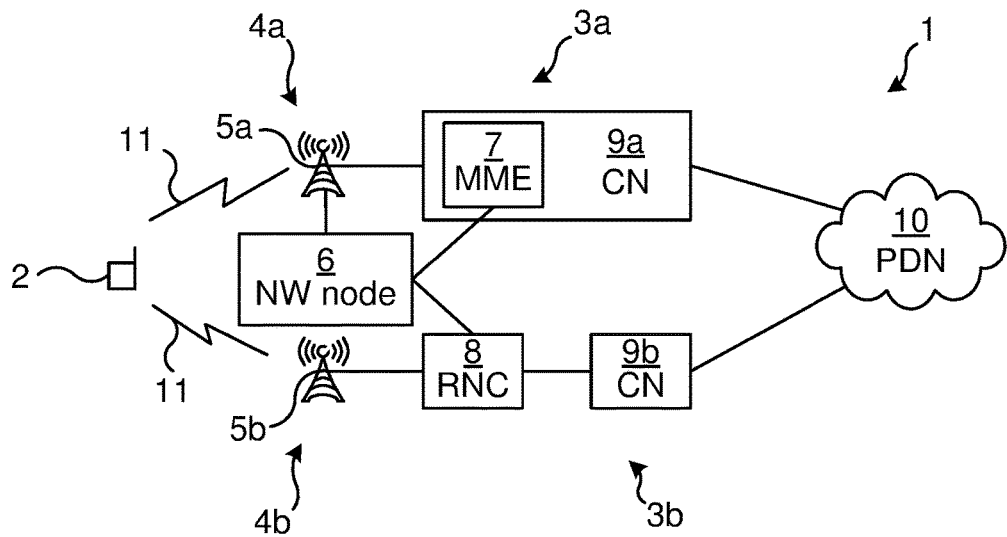
FIG. 1 is a schematic block diagram of an embodiment of a communication network in accordance with the present disclosure.

FIG. 1 illustrates a communication network 1, e.g. an operator network, comprising two different RATs, a first RAT 3a and a second RAT 3b for connecting a radio device 2 to a Packet Data Network (PDN) 10 e.g. the Internet. In some embodiments, the first RAT 3a is LTE. Additionally or alternatively, in some embodiments, the second RAT 3b is WCDMA, CDMA or GSM. As an example used in the present disclosure, the first RAT is LTE and the second RAT is WCDMA.

The first RAT 3a is associated with a first CN 9a which, among other nodes, comprises a Mobility Management Entity 7 if the first RAT is LTE. The first RAT is also associated with a first Radio Access Network 4a, typically a cellular network comprising a plurality of base stations 5a e.g. evolved Node B (eNB) of LTE.

Similarly, the second RAT 3b is associated with a second CN 9b and a second RAN 4b, typically a cellular network comprising a plurality of base stations 5b e.g. Node B of WCDMA. Also, if the second RAT is WCDMA, the second RAN 4b also comprises a Radio Network Control 8.

The radio device 2 may be any device or UE, mobile or stationary, enabled to communicate over a radio channel in a communication network, for instance but not limited to e.g. mobile phone, smartphone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC).

In accordance with the present disclosure, the radio device 2 may be connected via the first RAT 3a, i.e. via the first RAN 4a using the first RAT 3a. For some reason, the communication session 11 is moved from the first RAT to the second RAT, i.e. from the first RAN 4a using the first RAT 3a to the second RAN 4b using the second RAT 3b. As explained above, this may lead to difficulties in determining KPIs for the session since there may be no feedback from the second RAT network to the first RAT network. Instead, a network (NW) node 6 is used in accordance with the present disclosure. The NW node 6 may be part of the operator network 1 or be external to the operator network e.g. as part of a management network. Thus, in some embodiments, the method is performed by a network node 6 outside of operator networks of the first and second RATs 3a and 3b, e.g. in a management network. The NW node 6 is configured for extracting information from logs, e.g. cell trace logs, associated with the respective RATs 3a and 3b. For this, the NW node 6 may be connected to the eNB 5a holding a log for the first RAT and to the RNC 8 holding a log for the second RAT. In addition, the NW node 6 may be connected to the MME 7 in the first RAT CN 9a for extracting information held in a log in the MME which may be needed to identify the information held in the log in the eNB 5a.

In some embodiments, the session 11 is moved as part of Circuit-Switched Fallback (CSFB), Single Radio Voice Call Continuity (SRVCC), or inter RAT data handover.

As mentioned, the present disclosure uses an example in which the first RAT 3a is LTE and the second RAT 3b is WCDMA, but embodiments of the present disclosure may also be beneficial for other RAT combinations. Thus, in some embodiments, the first log may be a Cell Trace (CTR) User Equipment Traffic Recording (UETR) log, and, in the same or other embodiments, the second log may be a General Performance Event Handling (GPEH) log.

Figure 2:
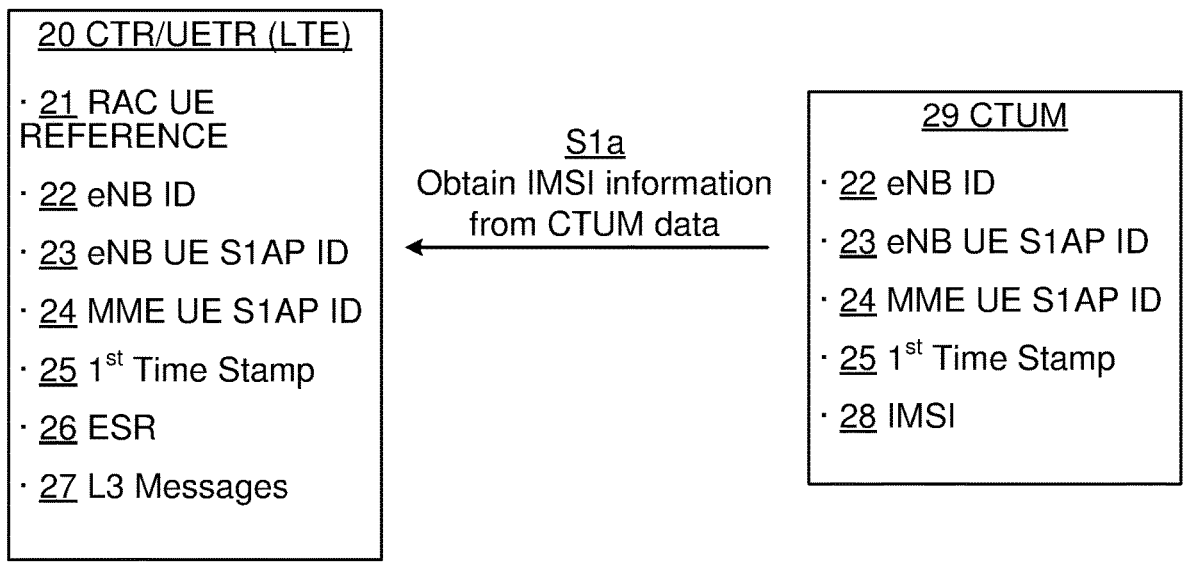
FIG. 2 is a schematic block diagram illustrating an embodiment of extraction of information from a third log which is associated with the first RAT.

FIG. 2 illustrates how a session ID 28 of a session logged in the first log CTR/UETR 20 in the eNB 5a may be obtained S1a from a third log, a Cell Trace UE ID Mapping (CTUM) log 29 in the MME 7. Due to security reasons, the International Mobile Subscriber Identity (IMSI) 28 of the radio device 2 is available in MME 7 trace log CTUM. The IMSI may be extracted from CTUM for all LTE sessions 11 using common identifiers available in both the first log (UETR) 20 and the third log (CTUM) 29 along with a first timestamp 25. As an example, the session ID as discussed herein is or comprises the IMSI 28 of the radio device 2.

Thus, in some embodiments of the present disclosure, the extracting first information from the at least a first log 20 comprises obtaining the session ID 28 from a third log 29 which is associated with the first RAT 3a. In some embodiments, the third log 29 is a CTUM log. In some embodiments, the session ID 28 is obtained by finding identification data 22, 23, 24 and/or 25 of the communication session 11 in the third log 29 which is identical to corresponding identification data in the first log 20. In some embodiments, the identification data comprises values of any or all of: eNB ID 22, eNB UE S1 interface Application Part (S1AP) ID 23, MME UE S1AP ID 24, and the first time stamp 25. A time offset may be used for linking the first time stamp 25 of the third log 29 with the first time stamp 25 of the first log 20, to account for any delay or inaccuracy.

As shown in FIG. 2, the first log 20 may also comprise Routing Area Code (RAC) UE reference 21, L3 messages and Extended Service Request (ESR) 26 information e.g. comprising information about which sessions 11 have been involved in CSFB.

Figure 3:
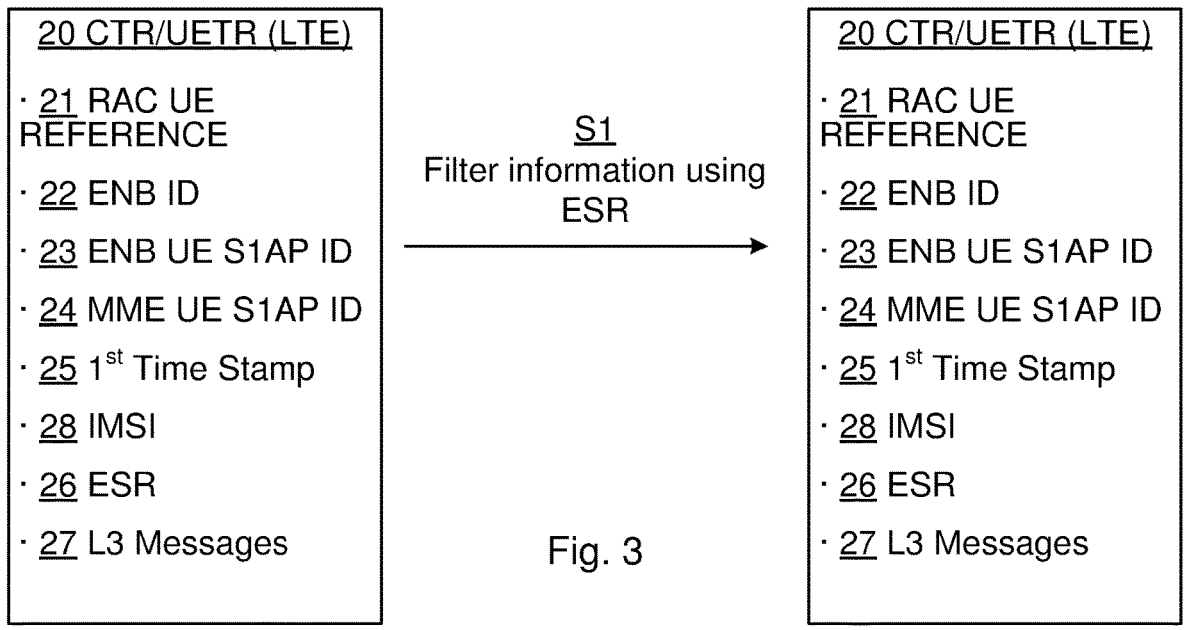
FIG. 3 is a schematic block diagram illustrating an embodiment of filtering information in a first log which is associated with the first RAT.

FIG. 3 illustrates how first information about the communication session 11, e.g. a voice call, may be extracted S1 from the first log 20 by filtering information relating to communication sessions which have moved between RATs from other communication sessions in the first log. This may be achieved by means of an ESR 26, whereby information as to which logged sessions 11 are associated with e.g. CSFB may be obtained. The information in the first log 20 relating to those sessions may then be extracted/filtered from information relating to other sessions. The information from the first log 20 which relates to a session 11 may be identified by a session ID 28 e.g. IMSI in combination with the first time stamp 25.

Thus, in some embodiments, the extracting S1 first information comprises using an extended service request 26.

Figure 4:
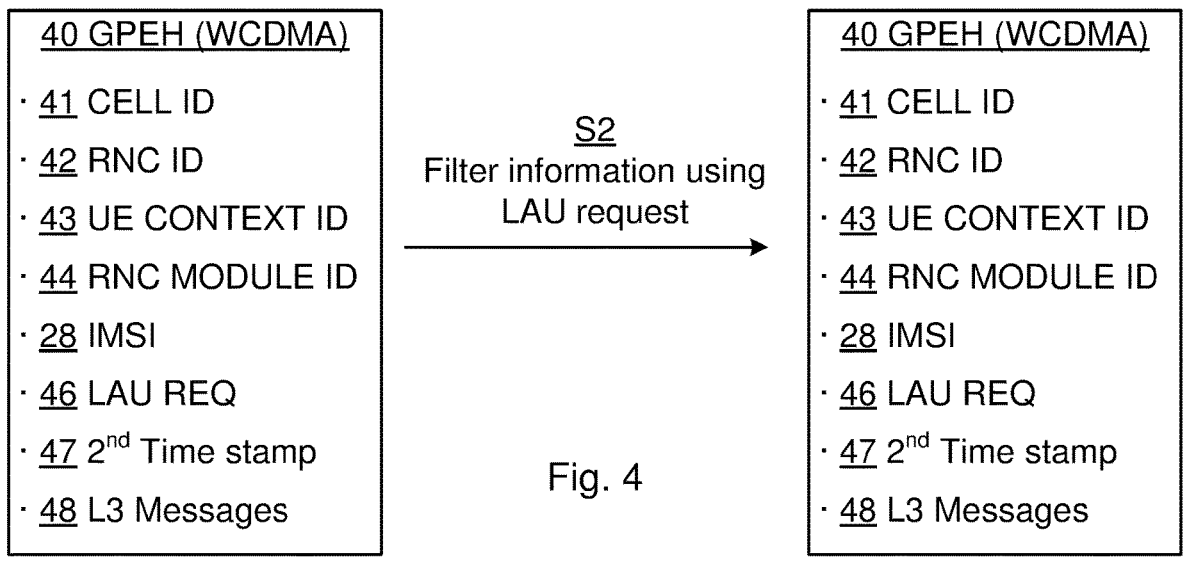
FIG. 4 is a schematic block diagram illustrating an embodiment of filtering information in a second log which is associated with the second RAT.

FIG. 4 similarly illustrates how second information about the communication session 11 may be extracted S2 from the second log 40 by filtering information relating to communication sessions which have moved between RATs from other communication sessions in the first log. The second log may be a General Performance Event Handling (GPEH) log in the RNC 8 of the second RAN 4b of the second RAT 3b. In WCDMA, the IMSI 28 is already available in the GPEH 40 data under Radio Access Network Application Part (RANAP) messages. There is thus no need for any actions in WCDMA corresponding to those of FIG. 2 relating to LTE. The GPEH log 40 comprises for each session 11: Cell ID 41, RNC ID 42, UE Context ID 43, RNC Module ID 44, the IMSI 28, a second time stamp 47 and L3 messages, as well as Location Area Update (LAU) request 46 information. By means of a LAU request 46, the information in the GPEH log 40 which relates to sessions 11 involving e.g. CSFB may be identified and filtered from information relating to other sessions logged in the GPEH log 40. The information from the second log 40 which relates to a session 11 may be identified by a session ID 28 e.g. IMSI in combination with the second time stamp 47.

Thus, in some embodiments, the second log 40 is a General Performance Event Handling, GPEH, log.

Additionally or alternatively, In some embodiments, the extracting S2 second information comprises using a LAU request 46.

Additionally or alternatively, the first information and second information, respectively, comprise information about network layer (L2) messages 27 and 48 of the communication session 11.

FIG. 5 illustrates how the information from the first and second logs 20 and 40 relating to the session 11 may be merged S3. Especially, the L3 messages 27 and 48, respectively, may be relevant for determining KPI of the communication session 11. That the first and second informations from the first and second logs 20 and 40 relate to the same session 11 may be determined by means of a combination of the IMSI 28 (which relates to the radio device 2 as subscriber and thus should be the same in both the first information and the second information) and the first and second timestamps which should correlate with each other (e.g. the second time stamp 47 may be appropriately later, by a predetermined time offset to account for delay, than the first time stamp 25) indicating that they relate to the same session which has been moved from the first RAT 3a to the second RAT 3b. In some embodiments, the merging S3 comprises using a predetermined time offset for relating the first and second time stamps 25 and 47 to each other.

Typically, informations about a plurality of sessions 11 are merged in this way, why it may be convenient to organize the merged information by means of assigning the sessions 11 reference ID:s as an alternative to using IMSI in combination with first and/or second time stamps which may be cumbersome (identifiers with many digits).

By means of the merged information, KPI:s of the communication session 11 may be determined. In some embodiments, the at least one KPI comprises any or all of: Call Success Rate, and Call Setup Time.

FIG. 6 is a flow chart of an embodiment of the method of the present disclosure. The method is for obtaining at least one KPI for a communication session 11 of a radio device 2, which communication session is moved from a first RAT 3a to a second RAT 3b.

First information about the communication session is extracted S1 from at least a first log 20 associated with the first RAT 3a by filtering information relating to communication sessions which have moved between RATs from other communication sessions in the first log. The first information comprises a session ID 28 and a first time stamp 25 associated with the communication session 11. As mentioned above, the extracting S1 first information may comprise obtaining S1a the session ID 28 from a third log 29 which is associated with the first RAT 3a.

Before, after or in parallel with extracting S1 the first information, second information about the communication session is extracted S2 from a second log 40 associated with the second RAT 3b by filtering information relating to communication sessions which have moved between RATs from other communication sessions in the second log. The first information comprises the session ID 28 and a second time stamp 47 associated with the communication session 11.

Then, the extracted S1 and S2 first and second information is merged S3 with each other by means of the session ID 28 and the first and second time stamps 25 and 47.

Then, the at least one KPI for the communication session 11 is determined S4 based on the merged S3 information.

In some embodiments, the method is performed by a network node 6 comprised in, or external to, the communication or operator network 1.

According to an aspect of the present disclosure, there is provided a method of obtaining at least one KPI for a communication session 11 of a radio device 2, which communication session is moved from a first RAT 3a to a second RAT 3b. The method comprises extracting S1 first information about the communication session from at least a first log 20 associated with the first RAT by filtering information relating to communication sessions which have moved between RATs from other communication sessions in the first log, the first information comprising a session ID 28 and a first time stamp 25 associated with the communication session 11. The method also comprises extracting S2 second information about the communication session from a second log 40 associated with the second RAT by filtering information relating to communication sessions which have moved between RATs from other communication sessions in the second log, the first information comprising the session ID 28 and a second time stamp 47 associated with the communication session 11. The method also comprises merging S3 the extracted S1 and S2 first and second information with each other by means of the session ID 28 and the first and second time stamps 25 and 47. The method also comprises determining S4 the at least one KPI for the communication session based on the merged S3 information.

FIG. 7a is a schematic block diagram of an embodiment of the network node 6. The network node 6 comprises processor circuitry 71 e.g. a central processing unit (CPU). The processor circuitry 71 may comprise one or a plurality of processing units in the form of microprocessor(s). However, other suitable devices with computing capabilities could be comprised in the processor circuitry 71, e.g. an application specific integrated circuit (ASIC), a field programmable gate array (FPGA) or a complex programmable logic device (CPLD). The processor circuitry 71 is configured to run one or several computer program(s) or software (SW) 81 (see also FIG. 8) stored in a storage 72 of one or several storage unit(s) e.g. a memory. The storage unit is regarded as a computer readable means 82 (see FIG. 8) as discussed herein and may e.g. be in the form of a Random Access Memory (RAM), a Flash memory or other solid state memory, or a hard disk, or be a combination thereof. The processor circuitry 71 may also be configured to store data in the storage 72, as needed. The network node 6 also comprises a communication interface 73, e.g. comprising a transmitter and a receiver, which may be combined to form a transceiver or be present as distinct units within the network node 6, for communication with nodes/elements in the communication network 1 e.g. the eNB 5a, the RNC 8 and/or the MME 7, for performing an embodiment of the method of the present disclosure.

According to an aspect of the present disclosure, there is provided a network node 6 configured for obtaining at least one KPI for a communication session 11 of a radio device 2, which communication session is moved from a first RAT 3a to a second RAT 3b. The network node comprises processor circuitry 71, and storage 72 storing instructions 81 executable by said processor circuitry whereby said network node is operative to extract first information about the communication session from at least a first log 20 associated with the first RAT by filtering information relating to communication sessions which have moved between RATs from other communication sessions in the first log, the first information comprising a session ID 28 and a first time stamp 25 associated with the communication session. The network node is also operative to extract second information about the communication session from a second log 40 associated with the second RAT by filtering information relating to communication sessions which have moved between RATs from other communication sessions in the second log, the first information comprising the session ID 28 and a second time stamp 47 associated with the communication session. The network node is also operative to merge the extracted first and second information with each other by means of the session ID 28 and the first and second time stamps 25 and 47. The network node is also operative to determine the at least one KPI for the communication session based on the merged information.

FIG. 7b is a schematic block diagram functionally illustrating an embodiment of the network node 6 in FIG. 7a. As previously mentioned, the processor circuitry 71 may run software 81 for enabling the network node 6 to perform an embodiment of the method of the present disclosure, whereby functional modules may be formed in network node 6 e.g. in the processor circuitry 71 for performing the different steps of the method. These modules are schematically illustrated as blocks within the network node 6. Thus, the network node 6 comprises a first extraction module 75 for extracting S1 first information about the communication session from at least a first log 20 associated with the first RAT by filtering information relating to communication sessions which have moved between RATs from other communication sessions in the first log, the first information comprising a session ID 28 and a first time stamp 25 associated with the communication session. The network node 6 also comprises a second extraction module 76 for extracting S2 second information about the communication session from a second log 40 associated with the second RAT by filtering information relating to communication sessions which have moved between RATs from other communication sessions in the second log, the first information comprising the session ID 28 and a second time stamp 47 associated with the communication session. The network node 6 also comprises a merging module 77 for merging S3 the extracted S1 and S2 first and second information with each other by means of the session ID 28 and the first and second time stamps 25 and 47. The network node 6 also comprises a determining KPI module 78 for determining S4 the at least one KPI for the communication session based on the merged S3 information.

Alternatively, the modules 75-78 may be formed by hardware, or by a combination of software and hardware.

According to an aspect of the present disclosure, there is provided a network node 6 configured for obtaining at least one KPI for a communication session 11 of a radio device 2, which communication session is moved from a first RAT 3a to a second RAT 3b. The network node 6 comprises means 75 for extracting S1 first information about the communication session from at least a first log 20 associated with the first RAT by filtering information relating to communication sessions which have moved between RATs from other communication sessions in the first log, the first information comprising a session ID 28 and a first time stamp 25 associated with the communication session. The network node 6 also comprises means 76 for extracting S2 second information about the communication session from a second log 40 associated with the second RAT by filtering information relating to communication sessions which have moved between RATs from other communication sessions in the second log, the first information comprising the session ID 28 and a second time stamp 47 associated with the communication session. The network node 6 also comprises means 77 for merging S3 the extracted S1 and S2 first and second information with each other by means of the session ID 28 and the first and second time stamps 25 and 47. The network node 6 also comprises means 78 for determining S4 the at least one KPI for the communication session based on the merged S3 information.

FIG. 8 illustrates an embodiment of a computer program product 80. The computer program product 80 comprises a computer readable (e.g. non-volatile and/or non-transitory) medium 82 comprising software/computer program 81 in the form of computer-executable components. The computer program 81 may be configured to cause a network node 6, e.g. as discussed herein, to perform an embodiment of the method of the present disclosure. The computer program may be run on the processor circuitry 71 of the network node 6 for causing it to perform the method. The computer program product 80 may e.g. be comprised in a storage unit or memory 82 comprised in the network node 6 and associated with the processor circuitry 71. Alternatively, the computer program product 80 may be, or be part of, a separate, e.g. mobile, storage means/medium, such as a computer readable disc, e.g. CD or DVD or hard disc/drive, or a solid state storage medium, e.g. a RAM or Flash memory. Further examples of the storage medium can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Embodiments of the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

According to an aspect of the present disclosure, there is provided a computer program product 80 comprising computer-executable components 81 for causing a network node 6 to perform an embodiment of the method of the present disclosure when the computer-executable components are run on processor circuitry 71 comprised in the network node.

According to another aspect of the present disclosure, there is provided a computer program 81 for obtaining at least one KPI for a communication session 11 of a radio device 2, which communication session is moved from a first RAT 3a to a second RAT 3b. The computer program comprises computer program code which is able to, when run on processor circuitry 71 of a network node 6, cause the network node to extract S1 first information about the communication session from at least a first log 20 associated with the first RAT by filtering information relating to communication sessions which have moved between RATs from other communication sessions in the first log, the first information comprising a session ID 28 and a first time stamp 25 associated with the communication session. The code is also able to cause the network node 6 to extract S2 second information about the communication session from a second log 40 associated with the second RAT by filtering information relating to communication sessions which have moved between RATs from other communication sessions in the second log, the first information comprising the session ID 28 and a second time stamp 47 associated with the communication session. The code is also able to cause the network node 6 to merge S3 the extracted S1 and S2 first and second information with each other by means of the session ID 28 and the first and second time stamps 25 and 47. The code is also able to cause the network node 6 to determine S4 the at least one KPI for the communication session based on the merged S3 information.

According to another aspect of the present disclosure, there is provided a computer program product 80 comprising an embodiment of the computer program 81 of the present disclosure and a computer readable means 82 on which the computer program is stored.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method of obtaining at least one key performance indicator (KPI) for a communication session of a radio device, which communication session is moved from a first radio access technology (RAT) to a second RAT, the method comprising:
    extracting first information about the communication session from at least a first log associated with the first RAT by filtering information relating to communication sessions which have moved between RATs from other communication sessions in the first log, the first information comprising a session identifier (ID) and a first time stamp associated with the communication session;
    extracting second information about the communication session from a second log associated with the second RAT by filtering information relating to communication sessions which have moved between RATs from other communication sessions in the second log, the second information comprising the session ID and a second time stamp associated with the communication session;

merging the extracted first and second information with each other by means of the session ID and the first and second time stamps; and determining the at least one KPI for the communication session based on the merged information.

2. The method of claim 1, wherein the extracting first information comprises obtaining the session ID from a third log which is associated with the first RAT.

3. The method of claim 2, wherein the third log is a Cell Trace UE ID Mapping (CTUM) log.

4. The method of claim 2, wherein the session ID is obtained by finding identification data of the communication session in the third log which is identical to corresponding identification data in the first log.

5. The method of claim 4, wherein the identification data comprises one or more of: an evolved Node B (eNB) ID, an eNB User Equipment (UE) S1 interface Application Part (S1AP) ID, a Mobility Management Entity (MME) UE S1AP ID, and the first time stamp.

6. The method of claim 1, wherein the first RAT is Long Term Evolution (LTE).

7. The method of claim 1, wherein the first log is a User Equipment Traffic Recording (UETR) log.

8. The method of claim 1, wherein the extracting first information comprises using an extended service request.

9. The method of claim 1, wherein the second RAT is Wideband Code Division Multiple Access (WCDMA), Code Division Multiple Access (CDMA), or Global System for Mobile Communications (GSM).

10. The method of claim 1, wherein the second log is a General Performance Event Handling (GPEH) log.

11. The method of claim 1, wherein the extracting second information comprises using a Location Area Update (LAU) request.

12. The method of claim 1, wherein the session is moved as part of Circuit-Switched Fallback (CSFB), Single Radio Voice Call Continuity (SRVCC), or inter RAT data handover.

13. The method of claim 1, wherein the first information and second information, respectively, comprise information about network layer messages of the communication session.

14. The method of claim 1, wherein the session ID comprises an International Mobile Subscriber Identity (IMSI) of the radio device.

15. The method of claim 1, wherein the merging comprises using a predetermined time offset for relating the first and second time stamps to each other.

16. The method of claim 1, wherein the communication session is a voice call.

17. The method of claim 1, wherein the method is performed by one of:

a network node outside of operator networks of the first and second RATs, and a network node in a management network.

18. The method of claim 1, wherein the at least one KPI comprises any or all of: Call Success Rate, and Call Setup Time.

19. A computer program product comprising a non-transitory computer readable medium storing software for causing a network node to perform the method of claim 1.

20. A network node configured for obtaining at least one key performance indicator (KPI) for a communication session of a radio device, which communication session is moved from a first radio access technology (RAT) to a second RAT, the network node comprising:

a storage unit; and processor circuitry coupled to the storage unit, wherein the network node is configured to:

extract first information about the communication session from at least a first log associated with the first RAT by filtering information relating to communication sessions which have moved between RATs from other communication sessions in the first log, the first information comprising a session identifier (ID) and a first time stamp associated with the communication session;

extract second information about the communication session from a second log associated with the second RAT by filtering information relating to communication sessions which have moved between RATs from other communication sessions in the second log, the second information comprising the session ID and a second time stamp associated with the communication session;

merge the extracted first and second information with each other by means of the session ID and the first and second time stamps; and determine the at least one KPI for the communication session based on the merged information.

21. The method of claim 4, further comprising using a predetermined time offset to link the first time stamp of the third log with the first time stamp of the second log.

* * * * *